J. R. MARSICO.
MECHANICAL HORN.
APPLICATION FILED OCT. 21, 1915.
1,269,477.
Patented June 11, 1918.
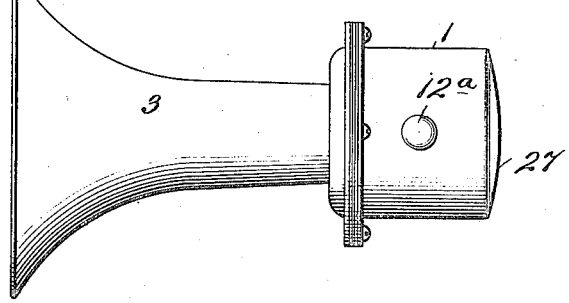
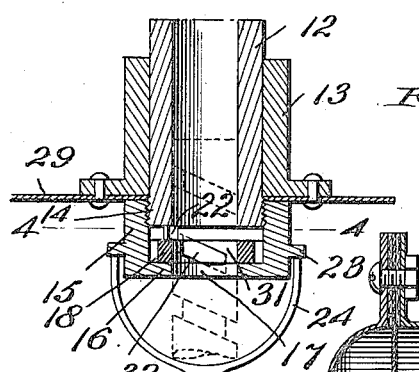
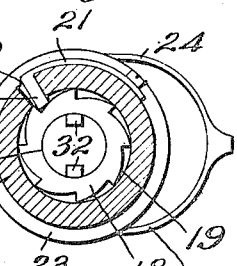
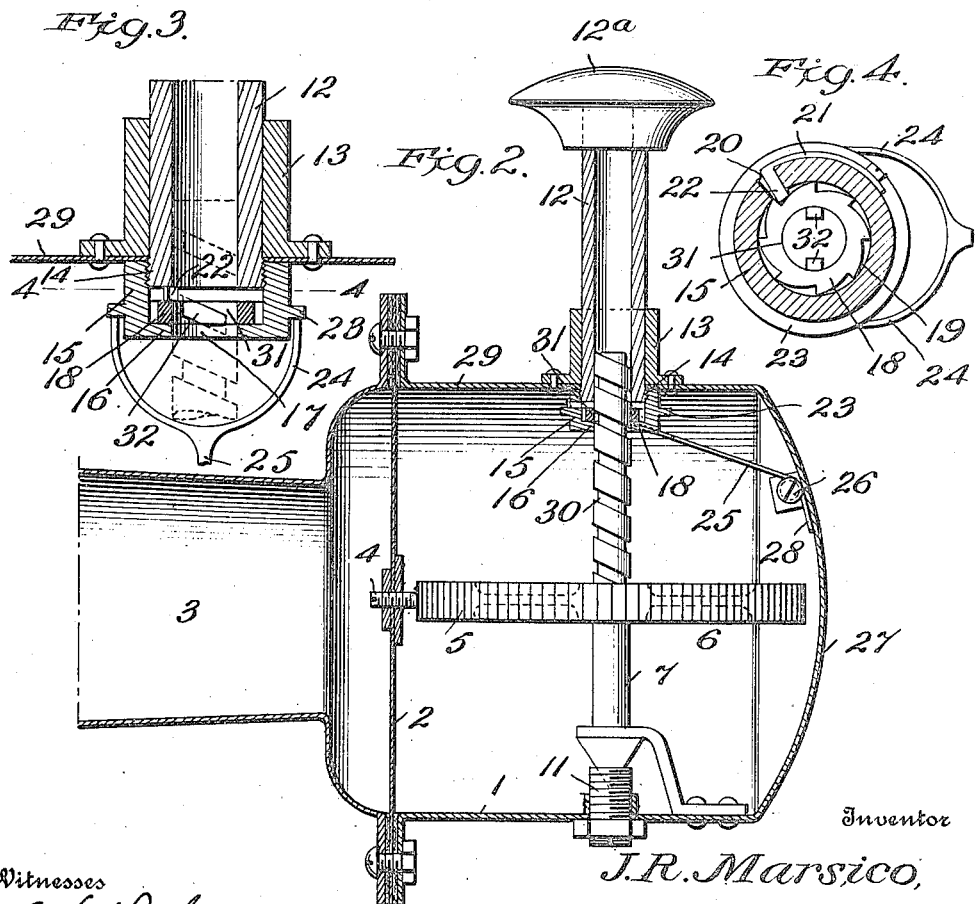
Witnesses
A. V. Doyle.
James P. Koehl
Inventor
J. R. Marsico,
By Victor J. Evans
Attorney

UNITED STATES PATENT OFFICE.

JERARD R. MARSICO, OF BROOKLYN, NEW YORK, ASSIGNOR TO THE SPARKS-WITHINGTON COMPANY, OF CLEVELAND, OHIO, A CORPORATION OF OHIO.

MECHANICAL HORN.

1,269,477.  Specification of Letters Patent.  Patented June 11, 1918.

Application filed October 21, 1915. Serial No. 57,111.

*To all whom it may concern:*

Be it known that I, JERARD R. MARSICO, a subject of the King of Italy, residing at Brooklyn, in the county of Kings and State of New York, have invented new and useful Improvements in Mechanical Horns, of which the following is a specification.

This invention relates to mechanical horns and has for its primary object the provision of a diaphragm and vibrating mechanism therefor consisting of a revolving element and means supporting the same for free movement against and in the presence of the diaphragm and for causing said element to revolve under its own action for quite a long duration after power is initially applied thereto.

Another object of the invention resides in the provision of a vibrator which will include a freely revoluble shaft having a fixed striker wheel thereon and an actuating device freely movable axially of the shaft and provided with means adapted to be brought into positive driving relation to the shaft on movement of the device in one direction to effectually set the shaft in motion and in turn causing positive movements to be imparted to the striker wheel and then successively with its operation as a driving means for the shaft to assume a position where it will be relatively free to thereby permit the wheel and its shaft to continue revolving by its own momentum.

Another object of the invention is to provide a mechanical sounding device including a diaphragm and revolving means for operating the same, and means for supporting and accurately balancing the striker means so as to maximize its efficiency and permit the same to be controlled manually with little exertion on part of the operator.

Figure 1 is a plan view of the horn.

Fig. 2 is a vertical section therethrough showing the parts on an enlarged scale.

Fig. 3 is a vertical section through the actuating device showing the mating clutch elements.

Fig. 4 is a horizontal section taken on the line 4—4 of Fig. 3.

The device consists of a suitable casing 1, provided with a vibrating diaphragm 2, which extends across the inner end of a horn 3. The diaphragm is provided at its center with a threaded adjustable stud 4 which may be moved with relation to the knocking surface 5 of a revolving striker wheel 6.

The vibrating mechanism, in addition to the revolving wheel 6, includes a shaft 7 to which the wheel is secured and adapted for rotation therewith. One end of the shaft is mounted in an adjustable bearing 11 at one side of the casing 1, and as illustrated the opposite end of the shaft is mounted to revolve in a tubular actuating and bearing forming member 12 which is adapted to move axially of the shaft and respectively to and from the striker wheel. The said member 12 is freely slidable in a fixed bearing sleeve 13 which is disposed diametrically opposite the bearing 11. The inner end of the member 12 is threaded at 14 and connected therewith is a correspondingly threaded support 15 having a base flange 16 which is provided with a central passage 17 which receives the adjacent end of the shaft 7. The flange 16 is spaced from the lower end of the member 12 and supported upon the flange is a clutch element 18 having an annular series of teeth 19.

The support 15 is provided with a radial passage 20 which is normally disposed above the clutch element 18. Mounted exteriorly of the support is a clutch element 21 having an active lug 22 which is adapted to be presented against one of the teeth of the clutch element 18 in a manner to be hereinafter explained. The lug 22 is freely movable in the passage 20 and it is maintained by the walls thereof in a position to actively co-act with the clutch element 18 at the requisite time.

The support 15 is provided with an annular flange 23 and bearing against the under side thereof are the companion branches 24—24 of a spring 25. This spring adjacent its end 28 is coiled around a stud 26 which is fixed to the crown 27 of the casing 1 so that the said spring is normally held under tension. In this manner, it is seen that the support 15 is normally held in an elevated position and against the adjacent wall 29 of the casing 1. The shaft 7 is provided at one side of the wheel 6 with a worm groove 30 which extends into the tubular actuating member 12 and through the central passage 31 of the clutch element 18. The clutch element 18 is provided with a suitable number of thread-forming surfaces 32 which are extended into the groove 30.

Having described the essential details of the invention, the operation thereof is now set forth as follows: Under the action of the spring 25 the clutch element 21 is normally held in an inactive position relatively to the clutch element 18 and it is observed that said spring normally operates to hold the tubular member 12 in an elevated position. Through the fact that the thread forming surfaces 32 are extended into the groove 30 it follows, that there is such resistance between the parts as is necessary to a normal retention of the clutch element 18 against the flange 16 of the mentioned support 15. When it is desired to set up vibration in the diaphragm 2, pressure of the hand is applied to the head or controlling knob 12ª of the member 12 so as to move said member in the direction of the wheel 6 and against the action of the spring 25. In so doing the lug 22 of the clutch element 21 is positively brought into co-acting engagement with one of the teeth of the clutch element 18. As the operator continues to move the member 12 in the direction of the said wheel 6 the clutch element 18 will operate as in the manner of a common nut against the worm portion of the shaft 7 and a quick rotation of the shaft 7 will follow. This quick or sudden rotation of the shaft results in the wheel 6 being rotated positively against the stud 4 and quick vibrations are set up in said diaphragm. On releasing pressure from the knob 12ª the member 12 will automatically assume its initial or normal position and the wheel 6 and shaft 7 will continue to revolve under its own momentum for a considerable period of time and continue to exercise its office as a diaphragm operating element.

The nicety in the general manner of assembling the various elements of the structure results in perfectly balanced parts and the diaphragm 2 may be effectually operated with comparatively little exertion on the part of the operator.

By using the operating or power transmitting member 12, as a bearing for one end of the shaft 7, and supporting from said member normally inoperative co-acting clutch elements, the shaft is adapted to revolve with a high degree of efficiency. Undue friction is avoided by supporting the shaft 7, from its ends only. All of the shaft except its extreme ends which extend into the bearings is free and normally out of contact with any of the working parts of the structure.

While I have shown and described one principal embodiment of my invention, by way of illustration, I wish it to be understood that I do not confine myself to all the precise details of construction herein set forth, as modifications, variations, or alterations may be made therein without departing from the spirit of the invention or exceeding the scope of the appended claims.

What is claimed as new is:

1. In a horn, an air-vibrating member, a rotary actuator for said vibrating member, a spiral shaft upon which said actuator is mounted, bearings for said spiral shaft, one of said bearings being slidable over the shaft, a nut mounted on the shaft, a cup-shape case secured to the slidable bearing and forming therewith a chamber inclosing the nut, said chamber of greater depth than the thickness of the nut and permitting movement of the nut axially of the shaft in said chamber, and a clutch element engaging said nut in one of its positions axially of the shaft and disengaged from the nut in another of said axial positions.

2. In a horn, an air-vibrating member, a rotary actuator for said vibrating member, a spiral shaft upon which said actuator is mounted, bearings for said spiral shaft, one of said bearings being slidable over the shaft, a pair of clutch elements carried by the sliding bearing, one of said clutch elements capable of limited movement longitudinally of the shaft relatively to the other element and adapted to engage the other clutch element upon relative movement in one direction, and to be disengaged therefrom upon relative movement in the opposite direction.

3. A mechanical horn comprising, a pair of bearings, a shaft having its extreme ends mounted in said bearings, said shaft having a worm groove, one of said bearings being mounted to slide over the grooved portion of the shaft, mating normally inactive clutch elements carried by the sliding bearing, one of said elements embracing the shaft and having a portion extending into the groove, said elements being adapted to coact with each other so as to impart rotary movement to the shaft when said sliding bearing is moved in one direction over said shaft, and a diaphragm over which the striker is adapted to revolve.

4. A mechanical horn comprising, a pair of bearings, a shaft having its extreme ends mounted in said bearings, said shaft having a worm groove, one of said bearings being mounted to slide over the grooved portion of the shaft, mating normally inactive clutch elements carried by the sliding bearing, one of said elements embracing the shaft and having a portion extending into the groove, said elements being adapted to co-act with each other so as to impart rotary movement to the shaft when said sliding bearing is moved in one direction over said shaft, and a diaphragm over which the striker is adapted to revolve, and means for normally holding said sliding bearing in a starting position.

5. A mechanical horn, comprising, a pair of bearings, a shaft having its extreme ends mounted in said bearings, said shaft having a worm groove, one of said bearings being mounted to slide over the grooved portion of the shaft, mating normally inactive clutch elements carried by the sliding bearing, and one of said elements embracing the shaft and having a portion extending into the groove, said elements being adapted to co-act with each other so as to impart rotary movement to the shaft when said sliding bearing is moved in one direction over said shaft, and a diaphragm over which the striker is adapted to revolve, and means for normally holding said sliding bearing in a starting position and comprising a spring having a terminal operatively connected with said sliding bearing.

6. A mechanical horn, comprising, a pair of bearings, a shaft having its extreme ends mounted in said bearings, said shaft having a worm groove, one of said bearings being mounted to slide over the grooved portion of the shaft, mating normally inactive clutch elements carried by the sliding bearing, one of said elements embracing the shaft and having a portion extending into the groove, said elements being adapted to co-act with each other so as to impart rotary movement to the shaft when said sliding bearing is moved in one direction over said shaft, and a diaphragm over which the striker is adapted to revolve, and means for normally holding said sliding bearing in a starting position and comprising a spring having a terminal operatively connected with said sliding bearing, and freely slidable thereover.

7. Operating mechanism for diaphragm horns, comprising, a revolving shaft having a fixed striker adapted to operate against the diaphragm, and provided with a worm groove, a pair of bearings normally receiving the ends of the shaft, one of said bearings being slidable over the worm portion of the shaft, a flange on the sliding bearing, a clutch element freely supported from the flange, and a clutch element normally spaced from the first element and adapted to be moved into engagement therewith on movement of the sliding bearing in one direction and to separate therefrom on movement of said bearing in an opposite direction, and a portion formed on the first element and extending into said worm groove.

8. Operating mechanism for diaphragm horns, comprising, a revolving shaft having a fixed striker adapted to operate against the diaphragm, and provided with a worm groove, a pair of bearings normally receiving the ends of the shaft, one of said bearings being slidable over the worm portion of the shaft, and provided with a flange, a clutch element freely supported from the flange, and a clutch element normally spaced from the first element and adapted to be moved into engagement therewith on movement of the sliding bearing in one direction and to separate therefrom on movement of said bearing in an opposite direction, a portion formed on the first element and extending into said worm groove, and having a terminal freely slidable over said flange and serving to normally hold both elements separated.

9. Operating mechanism for diaphragm horns, comprising, in combination with a striker and a revolving shaft fixed thereto, a pair of bearings supporting the shaft from the ends thereof, one of said bearings being slidable over the shaft, said shaft having a worm groove, a clutch element carried by the sliding bearing and having an internal portion extending into the worm groove, and a set of external teeth, a second yieldable clutch element carried by the same bearing and adapted to co-act with said teeth, and means for normally holding said second element normally separated from said first element as and for the purpose specified.

10. A mechanical horn, comprising, a casing having a diaphragm, a striker supported thereagainst, a shaft fixed to the striker and provided with a worm groove, a guide carried by the casing, a sliding member movable through the guide and forming a bearing for one end of the shaft, a clutch element supported by the member and disposed within the casing and having a portion extending into the worm groove, and a clutch element carried by the sliding member and adapted to be advanced into co-acting engagement with the first clutch element on movement of the sliding member toward the striker.

11. A mechanical horn, comprising, a casing having a diaphragm, a striker supported thereagainst, a shaft fixed to the striker and provided with a worm groove, a guide carried by the casing, a sliding member movable through the guide and forming a bearing for one end of the shaft, a clutch element supported by the member and disposed within the casing and having a portion extending into the worm groove, and a clutch element carried by the sliding member and adapted to be advanced into co-acting engagement with the first clutch element on movement of the sliding member toward the striker, and a portion threadedly connected with the sliding member and forming a rest for the first clutch element.

12. A mechanical horn, comprising, a casing having a diaphragm, a striker supported thereagainst, a shaft fixed to the striker and provided with a worm groove, a guide carried by the casing, a sliding member movable through the guide and forming a bearing for one end of the shaft, a clutch element supported by the member and disposed within the casing and having a portion extending into the worm groove, and a clutch element carried by the sliding member and adapted to be advanced into coacting engagement with the first clutch element on movement of the sliding member toward the striker, and a portion threadedly connected with the sliding member and forming a rest for the first clutch element, and a spring carried by the casing and having a free terminal adapted to slide over said portion.

In testimony whereof I, affix my signature in presence of two witnesses.

JERARD R. MARSICO.

Witnesses:
JOHN CALIZINRI,
GEO. A. BYRNE.